United States Patent
Carr et al.

(10) Patent No.: US 12,508,577 B2
(45) Date of Patent: Dec. 30, 2025

(54) SYNGAS AND METHOD OF MAKING THE SAME

(71) Applicant: HYCO1, Inc., Houston, TX (US)

(72) Inventors: Gregory Carr, Houston, TX (US); David DeVilliers, Katy, TX (US); Kurt A. Dieker, Maize, KS (US)

(73) Assignee: HYCO1, Inc., Houston, TX (US)

( * ) Notice: Subject to any disclaimer, the term of this patent is extended or adjusted under 35 U.S.C. 154(b) by 0 days.

(21) Appl. No.: 18/638,317

(22) Filed: Apr. 17, 2024

(65) Prior Publication Data

US 2025/0325966 A1    Oct. 23, 2025

(51) Int. Cl.

| | |
|---|---|
| *B01J 23/78* | (2006.01) |
| *B01J 23/02* | (2006.01) |
| *B01J 23/755* | (2006.01) |
| *B01J 35/63* | (2024.01) |
| *B01J 37/02* | (2006.01) |
| *B01J 37/04* | (2006.01) |
| *B01J 37/08* | (2006.01) |
| *C01B 3/40* | (2006.01) |

(52) U.S. Cl.
CPC ............... *B01J 23/78* (2013.01); *B01J 23/02* (2013.01); *B01J 23/755* (2013.01); *B01J 35/633* (2024.01); *B01J 37/0201* (2013.01); *B01J 37/0236* (2013.01); *B01J 37/04* (2013.01); *B01J 37/088* (2013.01); *C01B 3/40* (2013.01); *C01B 2203/0233* (2013.01); *C01B 2203/0238* (2013.01); *C01B 2203/061* (2013.01); *C01B 2203/062* (2013.01); *C01B 2203/1058* (2013.01); *C01B 2203/1082* (2013.01); *C01B 2203/1241* (2013.01)

(58) Field of Classification Search
None
See application file for complete search history.

(56) References Cited

U.S. PATENT DOCUMENTS

| | | | |
|---|---|---|---|
| 12,214,335 B2 | 2/2025 | Carr et al. | |
| 12,297,109 B1 | 5/2025 | Carr et al. | |
| 2003/0027096 A1 | 2/2003 | Barnett et al. | |
| 2003/0165424 A1* | 9/2003 | Ramani ............... | B01J 23/8986 502/328 |
| 2003/0172590 A1 | 9/2003 | Bhattacharyya et al. | |
| 2013/0116116 A1* | 5/2013 | Schwab ................ | B01J 35/615 502/328 |
| 2014/0145117 A1 | 5/2014 | Bal et al. | |
| 2015/0231608 A1* | 8/2015 | Jacobsen ................ | B01J 37/08 502/328 |

(Continued)

FOREIGN PATENT DOCUMENTS

WO    WO-2023009760 A1    2/2023

OTHER PUBLICATIONS

"U.S. Appl. No. 18/448,326, Final Office Action mailed Jun. 14, 2024", 12 pgs.

(Continued)

*Primary Examiner* — Joseph D Anthony
(74) *Attorney, Agent, or Firm* — Schwegman Lundberg & Woessner, P.A.

(57) ABSTRACT

A catalyst may include a metal oxide substrate comprising a nickel species, wherein an exposed surface of the catalyst comprises at least some of the nickel species and the exposed surface is substantially nonporous.

17 Claims, 2 Drawing Sheets

(56) References Cited

U.S. PATENT DOCUMENTS

| | | | | |
|---|---|---|---|---|
| 2015/0307352 | A1* | 10/2015 | Kumar | B01J 35/30 502/328 |
| 2018/0085740 | A1* | 3/2018 | Pontes Bittencourt | B01J 35/613 |
| 2018/0272322 | A1* | 9/2018 | Carr | B01J 23/78 |
| 2018/0353942 | A1* | 12/2018 | Liang | B01J 23/78 |
| 2021/0229073 | A1* | 7/2021 | Alsolami | B01J 37/031 |
| 2023/0242397 | A1* | 8/2023 | Carlsson | C01B 3/384 252/373 |
| 2023/0242398 | A1* | 8/2023 | Babovic | B01J 35/618 252/373 |
| 2023/0322551 | A1* | 10/2023 | Babovic | B01J 21/04 252/373 |
| 2023/0381750 | A1* | 11/2023 | Carr | B01J 35/30 |
| 2025/0196109 | A1 | 6/2025 | Carr et al. | |

OTHER PUBLICATIONS

"U.S. Appl. No. 18/448,326, Non Final Office Action mailed Feb. 26, 2024", 16 pgs.

"U.S. Appl. No. 18/448,326, Response filed Jan. 11, 2024 to Restriction Requirement mailed Nov. 13, 2023", 7 pgs.

"U.S. Appl. No. 18/448,326, Response filed May 28, 2024 to Non Final Office Action mailed Feb. 26, 2024", 10 pgs.

"U.S. Appl. No. 18/448,326, Restriction Requirement mailed Nov. 13, 2023", 7 pgs.

"International Application Serial No. PCT/US2022/038733, International Preliminary Report on Patentability mailed Feb. 8, 2024", 9 pgs.

"International Application Serial No. PCT/US2022/038733, International Search Report mailed Dec. 6, 2022", 4 pgs.

"International Application Serial No. PCT/US2022/038733, Invitation to Pay Additional Fees mailed Sep. 30, 2022", 2 pgs.

"International Application Serial No. PCT/US2022/038733, Written Opinion mailed Dec. 6, 2022", 7 pgs.

"U.S. Appl. No. 18/448,326, Response filed Sep. 12, 2024 to Final Office Action mailed Jun. 14, 2024", 7 pgs.

"U.S. Appl. No. 18/448,326, Examiner Interview Summary mailed Sep. 13, 2024", 3 pgs.

"U.S. Appl. No. 18/448,326, Notice of Allowance mailed Sep. 28, 2024", 9 pgs.

"U.S. Appl. No. 18/448,326, Notice of Allowability mailed Nov. 1, 2024", 2 pgs.

"International Application Serial No. PCT US2025 024333, International Search Report mailed Jun. 23, 2025", 2 pgs.

"International Application Serial No. PCT US2025 024333, Written Opinion mailed Jun. 23, 2025", 10 pgs.

* cited by examiner

SYNGAS AND METHOD OF MAKING THE SAME

BACKGROUND

Syngas, or synthesis gas, is a fuel gas mixture primarily including hydrogen, carbon monoxide, and often smaller amounts of carbon dioxide. The name comes from its use as an intermediate in creating synthetic natural gas (SNG) and for synthesizing products such as aviation fuel, diesel, base oils, naphtha, acetyls, ammonia or methanol.

SUMMARY OF THE INVENTION

The present disclosure presents numerous advantages and benefits, at least some of which are unexpected. For example, according to various aspects, the disclosed method of making syngas using the instant catalyst can produce a high yield of syngas compared to existing methods using other (conventional) catalysts. Additionally, according to various aspects, the disclosed catalyst can be capable of catalyzing the reaction to produce syngas without coking of the catalyst for a prolonged period of time under conditions that would cause significant coking (and resultant cessation or major reduction of catalytic function) with conventional catalysts. Additionally, according to various aspects, it was unexpectedly found that despite the catalyst having a reduced surface area compared to conventional catalysts that may have a higher degree of porosity, the instantly disclosed catalyst can be capable of producing a comparable or greater yield of syngas by surface area of the catalyst, by weight of the catalyst, by volume of the catalyst, or all three, all while being substantially free of coking. The catalyst's ability to remain substantially free of coke allows for optimized steam input for reduced energy for syngas production as well as reduced emissions from the thermal efficiency.

In some aspects, the methods described herein relate to a catalyst for catalyzing the production of syngas from a mixture including steam, hydrocarbon, and carbon dioxide, the catalyst including: a metal oxide substrate including a nickel species, wherein an exposed surface of the catalyst includes at least some of the nickel species and the exposed surface is substantially nonporous.

BRIEF DESCRIPTION OF THE FIGURES

The drawings illustrate generally, by way of example, but not by way of limitation, various aspects of the present invention.

DETAILED DESCRIPTION OF THE INVENTION

Reference will now be made in detail to certain aspects of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range were explicitly recited. For example, a range of "about 0.1% to about 5%" should be interpreted to include not just about 0.1% to about 5%, but also the individual values (e.g., 1%, 2%, 3%, and 4%, etc.) and the sub-ranges (e.g., 0.1% to 0.5%, 1.1% to 2.2%, 3.3% to 4.4%, etc.) within the indicated range. The statement "about X to Y" has the same meaning as "about X to about Y," unless indicated otherwise. Likewise, the statement "about X, Y, or Z" has the same meaning as "about X, or about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts may be carried out in any order without departing from the principles of the invention, except when a temporal or operational sequence is explicitly recited. Furthermore, specified acts may be carried out concurrently unless explicit claim language recites that they be carried out separately. For example, a claimed act of doing X and a claimed act of doing Y can be conducted simultaneously within a single operation, or in either order (X before Y or X after Y) and the resulting process will fall within the literal scope of the claimed process.

The term "about" as used herein can allow for a degree of variability in a value or range, for example, within 10%, within 5%, or within 1% of a stated value or of a stated limit of a range and includes the exact stated value or range as well. The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein may mean having none or having a trivial amount of, such that the amount of material present does not affect the primary properties of the composition including the material, by way of examples, a statement such that about 0 wt % to about 5 wt % of the composition is the material, or about 0 wt % to about 1 wt %, or about 5 wt % or less, or less than or equal to about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less, or about 0 wt %.

Described herein is a catalytic alloy catalyst (alternatively a catalytic alloy, a catalyst, or a catalyst in crystalline or partially crystalline form) and method for producing syngas using the catalyst. Syngas, or synthesis gas, is a gas mixture primarily of hydrogen, carbon monoxide, and potentially some carbon dioxide.

Syngas can be produced from many sources, including natural gas, coal, biomass, or virtually any hydrocarbon feedstock, by reaction with steam (e.g., steam reforming), carbon dioxide (e.g., dry reforming) or oxygen (e.g., partial oxidation). Syngas can be an intermediate resource for production of hydrogen, ammonia, acetyls methanol, carbon products, and synthetic hydrocarbon fuels. It is also used as an intermediate in producing synthetic hydrocarbons for use as a fuel or lubricant via the Fischer-Tropsch process.

Indeed, syngas plays an important role in the production of basic products we need in everyday life including but not limited to steel, glass, fuels, plastics, lubricants, etc. The conventional processes of Steam Methane Reforming (SMR) and Auto Thermal Reforming (ATR) are energy intensive due to all of the additional steam over the needed reactant ratio for stoichiometric conversion as an antifouling agent against the formation of coke on the catalyst or the production of oxygen in an ATR reaction. Additionally, conventional processes have high emissions relative to their output of syngas due to the amount of heat and excess steam needed for the reactor. For instance, SMR technology creates about 9 kg of greenhouse gas emissions for every kg of hydrogen produced.

In some aspects, the methods described herein relate to the reforming of $CO_2$ in contrast to other methods that are reducing $CO_2$ at a higher energy requirement for utilization as well as a lower overall conversion to final syngas. Reforming of $CO_2$ allows for the creation of carbon monoxide and hydrogen from a C1-C4 hydrocarbon and carbon dioxide without a water-gas shift reducing method. The methods described within allow for a high level of $CO_2$ utilization as a feed gas, greater than 50% and in their preferred embodiment of over 95%, regardless of the amount of steam added to tailor the ratio of hydrogen to carbon monoxide in the resultant syngas. Additionally, the capture of $CO_2$ emissions from the reactor with the use of waste heat from the process allows a low emissions process and the use of the emissions as a resultant feed gas into the syngas reactor.

The instant disclosure is drawn towards a steam reforming process as opposed to a dry reforming process for forming syngas. Steam reforming or steam methane reforming (SMR) is a method for producing syngas (hydrogen and carbon monoxide) by reaction of hydrocarbons and water. Commonly natural gas (mainly methane) is the primary feedstock (along with water). The main purpose of SMR technology is hydrogen production. The steam reforming reaction may be represented as shown below:

$$H_2O + CH_4 \rightleftharpoons 3H_2 + CO$$

The reaction is strongly endothermic ($\Delta HSR=206$ KJ/mol). Hydrogen produced by steam reforming is termed "grey hydrogen" when the waste carbon dioxide is released to the atmosphere and "blue hydrogen" when the carbon dioxide is (mostly) captured and stored geologically. Zero carbon "green" hydrogen is produced by thermochemical water splitting, using solar, wind, geothermal, or other low- or zero-carbon electricity or waste heat, or electrolysis, also using low- or zero-carbon electricity. Zero carbon emissions "turquoise" hydrogen is produced by one-step methane pyrolysis of natural gas yielding hydrogen and solid carbon.

Steam reforming of natural gas produces most of the world's hydrogen. Hydrogen is used in the industrial synthesis of ammonia, fuels and other chemicals. The method according to the instant disclosure includes treating a catalyst with a C1-C4 hydrocarbon such as methane and carbon dioxide as well as steam to produce carbon monoxide and hydrogen (syngas). The molar ratio of the steam to total carbon content is in a range of about 1:1 to about 2:1, about 1:1 to about 1.5:1, or about 1:1 to about 1.2:1. The "total carbon content" refers to the amount of hydrocarbon (e.g., methane) and carbon dioxide together as reactant. These ratios exclude the presence of any other gas besides carbon dioxide and the hydrocarbon.

The molar ratio of hydrogen and carbon monoxide produced is in a range of from about 4:1 to about 1:4, about 3:1 to about 1:3, about 2:1 to about 1:2, or about 1:1. The molar ratio can be constant during the production or it can be varied depending on the amount of reactants, rate of delivery of the reactants, or other factors. According to various aspects, the syngas produced is not subjected to any post-production processing to refine it. Examples of post-production processing can include a "gas-water shift" to convert carbon monoxide and water to hydrogen and carbon dioxide and a resulting change or tailoring of the aforementioned molar ratio of hydrogen to carbon monoxide. Alternatively, post-production processing can include use of a Vacuum Pressure Swing Adsorber (VPSA), a cryogenic separation process, membrane unit separation process, Pressure Swing Adsorber (PSA), or a combination thereof to purify the gas or change the ratio of gas for a downstream process.

A unique and advantageous aspect of the disclosed catalyst is that it has a very high conversion efficiency of the carbon dioxide reactant to syngas. In fact, in one method the amount of carbon dioxide emitted is in a range of from about 90% to about 97% less than a corresponding amount of carbon dioxide emitted from a method using a using a conventional catalyst that differs from the catalyst [claimed or described] in terms of chemical composition (matter, arrangement, crystalline or alloy structure, and/or concentration) and/or physical structure, such as porosity or distribution of matter. Moreover, owing to the extreme efficiency of the catalyst in comparison to conventional catalysts, it is possible to greatly reduce the amount of energy used to generate syngas, for example less than about 50% to 75% of the energy used to generate syngas for a corresponding conventional catalyst. To the extent that there is any leftover carbon dioxide or heat, the excess can be routed to another process or reused to generate more syngas.

Additionally, very little hydrocarbon reactant is left over following the production of syngas. For example, less than about 2 to 4 wt % hydrocarbon (e.g., methane) is left following the production of syngas or even no hydrocarbon is leftover in comparison to conventional catalysts leaving greater than 3% hydrocarbons.

The hydrocarbon used as a reactant can be obtained from many different sources such as a renewable natural gas, a landfill emission, an oil well emission, a coal mine emission, a livestock farm emission, or a mixture thereof.

The catalyst that is used for the production of syngas from carbon dioxide and hydrocarbon (e.g., methane) is an alloy catalyst. An alloy catalyst includes components that coexist as a lattice that includes a degree of crystallinity while also including at least some amorphous character. As a non-limiting example, the amorphous portion of the catalyst can be in range of from about 0.5 wt % to about 10 wt % of the catalyst, about 2 wt % to about 7 wt %, about 3 wt % to about 5 wt %, less than, equal to, or greater than about 0.5 wt %, 1, 1.5, 2, 2.5, 3, 3.5, 4, 4.5, 5, 5.5, 6, 6.5, 7, 7.5, 8, 8.5, 9, 9.5, or about 10 wt %. The mixing of components that form the catalyst can be accomplished, for example, by combining two normally solid materials when they have been melted into liquids at high temperatures and then cooling the resulting product to form a new solid composed of both materials (or a solid alloy) or by depositing vapors of the starting materials onto substrates to form thin films of the mixed materials. The nature of the mixed solid or alloy depends on the chemical properties of the components and the mixture's (or alloy's) crystalline structure, which determine how the atoms (and/or molecules) fit together in the mixed crystal lattice (possibly including any amorphous portions thereof). The new lattice may be substitutional, in which the atoms of one starting crystal replace those of the other, or interstitial, in which the atoms occupy positions normally vacant in the lattice containing only one material. The substances may present in an organized or consistent structure over a partial or even complete range of relative concentrations, producing a crystal (or alloy) whose properties vary (possibly continuously) over the range.

The materials that form the alloy catalyst can be chosen from materials that are capable of forming an alloy catalyst such as at least two materials having atomic (and/or molecular or ionic) radii that are within about 15% of each other; substantially the same or complementary crystalline structure; substantially the same electronegativity; substantially similar valency; or a combination thereof. The materials may generally be chosen from metal oxides and metal oxide precursors. In some specific examples, the catalyst may include a substantially nonporous metal oxide substrate and a nickel species uniformly (in crystalline regions) or otherwise (in amorphous regions) dispersed in (or mixed or "alloyed" with) the metal oxide substrate and at least partially embedded therein. Examples of metal oxides for the substrate may include magnesium oxide (MgO), nickel oxide (NiO), iron oxide (FeO), cobalt oxide (CoO), manganese oxide (MnO), or a mixture thereof. The mixture may include any combination or sub-combination of the metal oxides. For example, the mixture may be a binary mixture, tertiary mixture, quaternary mixture, or the like. In any mixture, the concentration of each of the metal oxides may be substantially the same, or alternatively, the concentration of at least one metal oxide may be different from the concentration of at least one other metal oxide.

The nonporous nature of the catalyst may be understood to refer to a "surface porosity," meaning that the catalyst may be free of pores that extend from the surface of the catalyst towards the interior of the catalyst. Such nonporous nature (or limited porosity when compared to conventional catalysts) of the catalyst may further be characterized by a lack of "internal porosity" meaning that the catalyst may be free of pores that extend through at least a portion of the catalyst. In some examples, the nonporous nature of the catalyst may refer to both the surface porosity and the internal porosity. Surface porosity, internal porosity, or both may be characterized by having a minimal number of pores or by individual pores, which may be present, having a small major dimension. A "major dimension" refers to the largest of the length, width, or thickness of an object or vacancy. For example, any surface pores or "through" pores may have a width of less than 50 nm, less than 40 nm, less than 30 nm, less than 20 nm, less than 10 nm, in a range of from about 10 nm to about 50 nm, about 10 nm to about 30 nm, or about 10 nm to about 15 nm. According to various aspects, a pore may account for less than about 20% of the total surface area of the catalyst, less than about 10% of the total surface area of the catalyst, less than about 5% of the total surface area of the catalyst, less than about 1% of the total surface area of the catalyst, or 0% of the total surface area of the catalyst. For example, a pore volume of the catalyst can be less than about 0.5 $cm^3/g$, less than 0.3 $cm^3/g$, less than 0.1 $cm^3/g$, or 0 $cm^3/g$.

The nonporous nature of the catalyst can help to prevent "coking" of the catalyst. Coking is one of several mechanisms that can be responsible for deactivation of a conventional catalyst used for reformation of carbon dioxide. Coking refers to the deposition of coke (a hard, strong, porous material of high carbon content) on the catalyst. If the catalyst has porosity, the coke can penetrate the pores and prevent reactants from interacting with active sites on the catalyst. However, the instant catalyst may be relatively nonporous and has a somewhat smooth, glassy surface, thus preventing coke from being deposited (or reducing its deposition) in any pores or on the surface of the catalyst.

Conventional catalyst design principles counsel against designing the catalyst to have such a low porosity. This is because it is thought (and in some cases has been demonstrated) that increasing porosity allows for a greater surface area to distribute active catalysts on and, therefore, produce more product. However, the inventors have surprisingly and unexpectedly found that the instant catalyst is capable of providing a very high yield of syngas despite having a comparatively smaller active surface area than a conventional catalyst having a higher degree of porosity. Although the instant catalyst does not have an increased surface area resulting from porosity, in some examples the surface area of the catalyst can be increased by including a series of surface structures such as grooves, undulations, or peaks-and-valleys on the surface of the catalyst. Unlike pores, which can be characterized as penetrating the surface of the catalyst, such surface structures do not penetrate the surface of the catalyst. For example, a bottom or lowest portion of the surface structure whether grooves, undulations, or peaks-and valleys is still characterized as the surface of the catalyst.

The metal oxide substrate can be generally a continuous structure. For example, the metal oxide substrate may give the catalyst its overall structure. The overall structure of the catalyst substrate may be substantially spherical, substantially cylindrical, substantially flat, or it may have an undulating profile. The substrate on the surface of which the catalyst is present may be solid. Alternatively, the catalyst may have at least one through pore. For example, the catalyst may have a "wagon wheel" structure in which the catalyst is circular with a number of through pores extending from a first end of the catalyst to a second end of the catalyst. The catalyst may have any number of through pores, for example the catalyst may have a single through pore or a plurality of through pores. In some examples, it may be possible for the catalyst to include a number of indentations that penetrate partially through the thickness of the catalyst, which may be helpful to increase the surface area as well. The through pore(s) may extend substantially along the largest dimension of the catalyst or a smaller dimension. A largest dimension of the catalyst may be in a range of about 100 μm to about 52 mm, about 1 mm to about 10 mm, in a range of about 4 mm to about 6 mm, or less than, equal to, or greater than about 100 μm, 200 μm, 1 mm, 1.5 mm, 2 mm, 2.5 mm, 3 mm, 3.5 mm, 4 mm, 4.5 mm, 5 mm, 5.5 mm, 6 mm, 6.5 mm, 7 mm, 7.5 mm, 8 mm, 8.5 mm, 9 mm, 9.5 mm, 10 mm, 10.5 mm, 11 mm, 11.5 mm, 12 mm, 12.5 mm, 13 mm, 13.5 mm, 14 mm, 14.5 mm, 15 mm, 15.5 mm, 16 mm, 16.5 mm, 17 mm, 17.5 mm, 18 mm, 18.5 mm, 19 mm, 19.5 mm, or about 20 mm. The largest dimension can refer to a length, width, or diameter of the catalyst.

The nickel species of the catalyst may include elemental nickel, nickel oxide, or a mixture thereof. In total, the nickel species may be about 0.2 wt % to about 30 wt % of the catalyst, about 14 wt % to about 25 wt % of the catalyst, or less than, equal to, or greater than about 0.2 wt % of the catalyst, 1, 2, 3, 4, 5, 6, 7, 8, 9, 10, 11, 12, 13, 14, 15, 16, 17, 18, 19, 20, 21, 22, 23, 24, 25, 26, 27, 28, 29, or about 30 wt % of the catalyst. The nickel species can be homogeneously distributed about the metal oxide substrate. In most examples, the nickel species may include nickel oxide as opposed to elemental nickel.

At least a portion of the nickel species may be exposed on a surface of the metal oxide substrate. The portion of the nickel species that may be exposed on the surface of the metal oxide substrate may be available to be contacted directly with one or more of the reactants and catalyze the reaction to produce syngas. The exposed portion of the nickel species may be bound to the metal oxide substrate as in other alloys or otherwise.

The nickel species that is exposed on a surface of the metal oxide substrate may be primarily nickel oxide as opposed to elemental nickel. For example, the nickel species that is exposed on a surface of the metal oxide substrate may be from about 80 wt % to about 100 wt % nickel oxide, about 95 wt % to about 100 wt % nickel oxide, less than, equal to, or greater than about 80 wt %, 85, 90, 95, or 100 wt % nickel oxide. In total, the amount of the nickel species exposed on a surface of the metal oxide substrate may be in a range of from about 10 wt % to about 30 wt % of the nickel species, about 14 wt % to about 18 wt % of the nickel species, less than, equal to, or greater than about 10 wt %, 11, 12, 13, 14, 15, 16, 17, 18, 19, 20, 21, 22, 23, 24, 25, 26, 27, 28, 29, or 30 wt %. The exposed nickel species may account for about 10% to about 90% of the total surface area of the catalyst, about 20% to about 80% of the total surface area of the catalyst, about 30% to about 70% of the total surface area of the catalyst, about 40% to about 60% of the total surface area of the catalyst, less than, equal to, or greater than about 10% of the total surface area of the catalyst, 15, 20, 25, 30, 35, 40, 45, 50, 55, 60, 65, 70, 75, 80, 85, or about 90% of the total surface area of the catalyst. As an example, a catalytic surface area may range from about 0.05 $m^2/g$ to about 0.5 $m^2/g$ or higher. The pore volume of the catalyst on which the catalyst is present may range from about 0.0005 $cm^3/g$ to about 0.05 $cm^3/g$.

As described herein, the nickel species may be generally free of unbound or free elemental nickel as it is part of the nickel in the crystalline lattice. However, to mitigate the expected coking risk of free elemental nickel being present, the catalyst may include potassium ions distributed in or at the surface of the catalyst. Where present, the potassium ions range from about 0.2 wt % to about 5 wt % of the catalyst on the substrate, about 1 wt % to about 2 wt % of the catalyst on the substrate, less than, equal to, or greater than about 0.2 wt % of the catalyst on the substrate, 0.5, 1, 1.5, 2, 2.5, 3, 3.5, 4, 4.5, or about 5 wt % of the catalyst on the substrate. The potassium ions may be supplied as potassium nitrate, potassium acetate, potassium carbonate, or a mixture thereof. In various aspects, the catalyst is free of free elemental nickel. However, if free elemental nickel is present, it is expected to be less than about 2 wt % free elemental nickel in the nickel species, less than about 0.5 wt % free elemental nickel in the nickel species or does not contain free elemental nickel in the nickel species.

In use, the catalyst may be contacted with a feed stream including, in many examples, methane and carbon dioxide to produce carbon monoxide and hydrogen (syngas).

The catalyst may produce syngas from a wide array of steam, methane and carbon dioxide sources. For example, the steam, methane, and carbon dioxide sources may be a feed stream of industrial waste (e.g., a power plant exhaust source, fermentation byproduct or primary product gas, landfill methane reclamation, bio-digester methane production, steel furnace exhaust gas, cement plant exhaust gas, ammonia byproducts, methanol tail gas, flare gas, or the like), an air captured carbon source, or a mixture thereof. In some examples, the feed stream may be captured and supplied to the catalyst. In some other examples, the source of the feed stream may be directly coupled (e.g., co-located) with an apparatus for the production of syngas, such that the feed stream is directly put into contact with the catalyst. Thus, a producer of an environmentally unfriendly gas may recoup environmental, economic, and/or social benefits from an off-gas use.

Before the catalyst is contacted with the feed stream including steam, carbon dioxide, and methane, the catalyst may be activated. Activating the catalyst may include contacting the catalyst with a mixture of hydrogen gas and nitrogen gas for a time in a range of from about 0.1 hour to about 6 hours, about 2 hours to about 5 hours, less than, equal to, or greater than about 0.11 hour, 0.5, 1, 2, 3, 4, 5, or 6 hours. Activation may occur at a temperature in a range of from about 400° C. to about 600° C., about 450° C. to about 500° C., less than, equal to, or greater than about 400° C., 410, 420, 430, 440, 450, 500, 550, or about 600° C. A ratio of hydrogen gas to nitrogen gas used to activate the catalyst may be in a range of from about 90:10 to about 70:30 or about 85:15 to about 75:25.

The hydrogen and carbon monoxide of the syngas may be produced in a molar ratio of about 3.5:1, 3:1, 2:1, 1:1, 1:2, or about 1:3. These ratios exclude the presence of any other gas besides carbon monoxide and hydrogen. In the reaction at least 70 wt % of the steam, carbon dioxide, and methane that contacts the catalyst are converted to carbon monoxide and hydrogen per turn (or pass), at least 90 wt % of the steam, carbon dioxide, and methane that interact with the catalyst are converted to carbon monoxide and hydrogen per turn, about 70 wt % to about 99 wt %, about 90 wt % to about 99 wt %, or about 95 wt % to about 98 wt %. Thus, the catalyst of the instant disclosure may be capable of producing commercially viable yields of syngas. In addition to the yield, the kinetics of the catalyst is very fast. For example, the catalyst may have a gas hourly space velocity of about 1000 to about 7000, about 3000 to about 5000, less than, equal to, or greater than about 2000, 2500, 3000, 3500, 4000, 4500, or 5000. As understood a "turn" (or pass) refers to a contacting event of the carbon dioxide and methane with the catalyst to form syngas.

The kinetics and yield of the reaction may be impacted by the pressure at which the steam, methane, and carbon dioxide are contacted with the catalyst. For example, steam, methane, and carbon dioxide may be contacted with the catalyst at a pressure in a range of from about 25 KPa to about 3500 KPa, about 30 KPa to about 2100 KPa, less than equal to or greater than about 25 KPa, 50, 100, 150, 200, 250, 300, 350, 400, 450, 500, 550, 600, 650, 700, 750, 800, 850, 900, 950, 1000, 1500, 2000, 2100, 2200, 2300, 2400, 2500, 2600, 2700, 2800, 2900, 3000, 3100, 3200, 3300, 3400, or about 3500 KPa.

The kinetics and yield of the reaction may also be impacted by the flow rate of the feed stream. In some examples the flow rate of the feed stream may be measured in terms of a gas hourly space velocity (GHSV) that may be in a range of from about 500 $h^{-1}$ to about 11000 $h^{-1}$ about 1000 $h^{-1}$ to about 10000 $h^{-1}$, less than, equal to, or greater than about 500 $h^{-1}$, 1000, 1500, 2000, 25000, 3000, 3500, 4000, 4500, 5000, 5500, 6000, 6500, 7000, 7500, 8000, 8500, 9000, 9500, 10000, 10500, or 11000 $h^{-1}$.

Additionally, the kinetics and yield of the reaction may be impacted by the temperature at which the reaction is performed. In some examples, the reaction may be performed at a temperature in a range of from about 530° C. to about 2000° C., about 276° C. to about 1371° C., about 815° C. to about 1093° C., less than, equal to, or greater than about 530° C., 540, 550, 560, 570, 580, 590, 600, 610, 620, 630, 640, 650, 660, 670, 680, 690, 700, 710, 720, 730, 740, 750, 780, 790, 800, 810, 820, 830, 840, 850, 860, 870, 880, 890, 900, 910, 920, 930, 940, 950, 960, 970, 980, 990, 1000, 1010, 1020, 1030, 1040, 1050, 1060, 1070, 1080, 1090, 1100, 1110, 1120, 1130, 1140, 1150, 1160, 1170, 1180, 1190, 1200, 1210, 1220, 1230, 1240, 1250, 1260, 1270, 1280, 1290, 1300, 1310, 1320, 1330, 1340, 1350, 1360, 1370, 1380, 1390, 1400, 1410, 1420, 1430, 1440, 1450, 1460, 1470, 1480, 1490, 1500, 1510, 1520, 1530, 1540, 1550, 1560, 1570, 1580, 1590, 1600, 1610, 1620, 1630, 1640, 1650, 1660, 1670, 1680, 1690, 1700, 1710, 1720, 1730, 1740, 1750, 1780, 1790, 1800, 1810, 1820, 1830, 1840, 1850, 1860, 1870, 1880, 1890, 1900, 1910, 1920, 1930, 1940, 1950, 1960, 1970, 1980, 1990, or about 2000° C. In some examples, the heat required to reach the temperature will be provided from the feed stream. Additionally, or in other examples the catalyst may be located in a vessel, which may be heated to achieve the desired reaction temperature. The ability to run the reaction at these high temperatures allows for faster production of syngas and is made possible by the catalyst being sintered and therefore able to be exposed to high temperatures without substantially decomposing.

Importantly, and contrary to conventional catalysts for the production of syngas, the instantly disclosed catalyst may be substantially free of coking during performance of the method. For example, the catalyst may be free of coking for a period of time of at least 1 week, at least one month, at least 6 months, at least 1 year, at least 2 years, or at least 3 years. By "free of coking" it is meant that the catalyst may continuously catalyze the syngas production reaction without about 20% to about 100% loss of catalytic activity, about 40% to about 80% loss of catalytic activity, less than, equal to, or greater than about 30% loss of catalytic activity, 35, 40, 45, 50, 55, 60, 65, 70, 75, 80, 85, 90, 95, or about 100% loss of catalytic activity.

Although the catalyst of the instant disclosure shows good anti-coking properties, the catalyst may be steam treated, if desired, to remove any amount of coke that may be present. The steam delivered is in addition to any steam used as a reactant. To steam treat the catalyst, the flow of the feed stream is cut off, and steam at a temperature in a range of from about 150° C. to about 1000° C., about 200° C. to about 260° C., or less than, equal to, or greater than about 150° C., 160, 165, 170, 175, 180, 185, 190, 195, 200, 205, 210, 215, 220, 225, 230, 235, 240, 245, 250, 255, 260, 265, 270, 275, 280, 285, 290, 295, 300, 305, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, or about 1000° C., is fed to the catalyst. Steam can be fed to the catalyst for a suitable amount of time, such as an amount of time in a range of from about 0.2 hours to about 20 hours, about 2 hours to about 15 hours, less than, equal to, or greater than about 0.2 hours, 0.5, 1, 2, 3, 4, 5, 6, 7, 8, 9, 10, 11, 12, 13, 14, 15, 16, 17, 18, 19, or about 20 hours. The performance of the catalyst can be continually monitored and if the performance drops below a certain threshold the syngas production may be stopped, and the catalyst may be steam treated to remove any coke that may be present. Importantly, if the catalyst is treated with steam, the catalyst may be reused to produce syngas, unlike most conventional catalysts. Coke may also be removed by exposure to carbon dioxide and water.

The catalyst described herein may be formed according to any suitable method. An example of a suitable method may include mixing a nickel solution into a metal oxide powder to form a mixed powder.

Alternatively, the mixed powder may be formed by co-precipitation of a nickel solution and a single metal or multiple metal oxide [?] solutions selected from the group of cobalt, iron, manganese and magnesium. The nickel solution may include nickel (II) nitrate hexahydrate, nickel (II) di-acetate, nickel (II) carbonate, or a combination thereof. In some examples, nickel (II) nitrate hexahydrate may be particularly suited for the method. The metal oxide powder may include any of the metal oxides described herein. In some examples, magnesium oxide may be particularly well suited to form an alloy catalyst along with nickel (II) hexahydrate. In some examples, it was found that controlling the $d_{50}$ of the metal oxides present helped to form the alloy catalyst. For example, suitable $d_{50}$ values for the metal oxide may be in a range of from about 2 μm to about 120 μm, about 5 μm to about 100 μm, less than, equal to, or greater than about 2 μm, 5, 10, 15, 20, 25, 30, 35, 40, 45, 50, 55, 60, 65, 70, 75, 80, 85, 90, 95, 100, 105, 110, 115, or about 120 μm. The nickel solution and the metal oxide are readily soluble in each other, which facilitates even mixing.

After the new powder is formed in an aqueous solution or paste, the new powder may be dried. The new powder may be air dried or heated. Following drying, the new powder becomes a dried paste. The dried paste may then be crushed to form a dried powder. Crushing may be accomplished using ball-milling, granulation, roller milling, or a combination thereof. Crushing may occur for a range of time of about 0.5 hours to about 5 hours, about 2 hours to about 4 hours, less than, equal to, or greater than, about 0.5 hours, 1 hour, 2 hours, 3 hours, 4 hours, or 5 hours. However, if the mixed powder is spray dried, there may be no need for crushing.

The dried powder may then be calcined. Calcining the dried powder converts the nickel species to nickel oxide. Calcining may occur at a temperature in a range of from about 400° C. to about 2000° C., about 500° C. to about 1500° C., about 950° C. to about 1050° C., less than, equal to, or greater than about 400° C., 450, 500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, or about 2000° C. A temperature of 950° C. to about 1050° C. has been found to be particularly effective. Calcining may occur for a time in a range of from about 0.5 hours to about 12 hours, about 1 hour to about 3 hours, less than, equal to, or greater than about 0.5 hours, 1, 1.5, 2, 2.5, 3, 3.5, 4, 4.5, 5, 5.5, 6, 6.5, 7, 7.5, 8, 8.5, 9, 9.5, 10, 10.5, 11, 11.5, or 12 hours.

The catalyst can also be prepared by mixing a nickel solution into a metal oxide powder with incipient wetness impregnation, to form a paste. Alternatively, the nickel solution and metal oxide powder may be dry mixed to make a slurry. The paste or slurry may be dried to produce a dispersed powder. The dried powder may be calcined as described above to form the catalyst. As generally understood, a paste refers to a thickened mixture of insoluble matter and a slurry refers to a mixture of dense solids suspended in liquid.

The catalyst has been described as a solid. However, it is also possible and within the scope of the instant disclosure for the catalytic material to be a coating present on a substrate that is substantially inert to methane, carbon dioxide, carbon monoxide, and hydrogen. Examples of such a substrate include a silica or a ceramic. The substrate may take on any suitable shape such as a sphere, a rod, a latticed structure, a porous structure, or the like. The average thickness of the coating may be in a range of from about 0.1 mm to about 2.5 mm, about 0.15 mm to about 2 mm, less than, equal to, or greater than about 0.1 mm, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, or about 2.5 mm. The substrate may be coated with the catalyst to any suitable degree. For example, about 30% to about 100% of the total surface area of the substrate may be coated with the catalyst, about 40% to about 90% of the total surface area of the substrate may be coated with the catalyst, about 50% to about 80% of the total surface area of the substrate may be coated with the catalyst, less than, equal to, or greater than about 30% of the total surface area of the substrate, 35, 40, 45, 50, 55, 60, 65, 70, 75, 80, 85, 90, 95, or about 100% of the total surface area of the substrate. Manufacturing the catalyst coated substrate may largely follow the protocols describe herein above with the additional step of applying the mixed powder to the substrate material and drying the mixed powder thereon ahead of calcining the dried powder to form the catalyst coating on the substrate.

To produce syngas at a commercially desirable level, the catalyst may be incorporated into an assembly. In some examples, the catalyst may be retrofit into an existing assembly. For example, the catalyst may be located within a reaction vessel. According to various examples, a reaction vessel may include a tube. The tube may be configured to have a generally cylindrical profile with an inlet and an outlet. Without being so limited, the inlet may be located proximate to or at the bottom of the tube and the outlet may be located proximate to or at the top of the tube. As an additional example, the inlet may be located proximate to or at the top of the tube and the outlet may be located proximate to or at the bottom of the tube.

The reaction vessel may take on other shapes and configurations as well. For example, in some cases a heat source such as a furnace may be placed in thermal communication with the reaction vessel. The reaction vessel may include a feedback loop to direct carbon dioxide produced by the heat source to the reaction vessel to participate in the instantly described method for producing syngas. Routing carbon dioxide back to the reaction vessel may significantly reduce the carbon dioxide emissions of a plant using the instantly disclosed method. In some examples, the carbon dioxide emissions may be virtually non-existent.

Heat generated from the reactor may be used to run an amine recovery operation of any carbon dioxide emission present in the flue gas of the reactor. Additionally, any flue gas from the reaction may be captured or used as reactant such that the overall process is a zero emissions process.

The catalyst may be fixed within the reaction vessel. For example, the catalyst may be adhered to an inner surface of the reaction vessel. As another example, a retention device may be located within the reaction vessel and the catalyst can be retained by the retention device. The reaction assembly may include any plural number of catalysts (or units of substrate coated with catalyst). The optimum amount of catalyst in the reaction assembly may be determined with a loading test. This may involve checking for void space in the catalyst retention device and/or reaction assembly and packing density in the assembly to optimize the amount of catalyst. The composition (e.g., chemical composition) or physical characteristics (e.g., catalyst substrate/particle size) of the individual catalysts can be the same or different. The distribution of the catalysts may be an even distribution (e.g., an equal amount of catalysts across the reaction vessel) or an uneven distribution (e.g., a gradient of amounts of catalysts or a large or small concentration of catalyst at a first location relative to a second location). An even distribution of the catalyst may be helpful to increase the possibility that as much feed gas as possible can contact the catalyst. If the catalyst is only placed at one location, for example, there may be a risk that some feed gas may go past the catalyst without reacting, thereby decreasing the yield of syngas relative to the amount of feed gas supplied.

The metal of the reaction vessel may be a metal showing high thermal resistivity as well as inertness to the feed gas and syngas. The high thermal resistivity may be helpful to maintain the integrity of the reaction vessel when exposed to the potentially high temperatures of the feed gas, the source of heat required to bring conditions inside the reaction vessel to a temperature suitable for conducting the reaction, as described herein, or both.

The syngas produced according to the instantly described methods may be used in many different industrial applications. For example, the syngas produced may be utilized as a feedstock that may then be used to form a carbon containing substance such as a paraffinic base oil, a paraffinic wax, a solvent, a fuel, ammonia, methanol, ethanol, propanol, butanol, pentanol, acetic acid, dimethoxyethane, purified $H_2$, purified CO, a blend of hydrogen and carbon monoxide, amide, dimethyl carbonate, ethyl methyl carbonate, oxo-alcohols, graphene, carbon fiber, carbon nanotubes, carbon black, graphite, or a mixture thereof. In some examples, the syngas provided may be directly fed into the industrial application.

Additional hydrogen may be formed using the carbon monoxide in the syngas as a reactant. The additional hydrogen may be formed, for example, through what is called the water-gas-shift reaction represented below:

$$CO + H_2O \rightleftharpoons CO_2 + H_2 \quad -41 \text{ kJ/mol}$$

The carbon monoxide used for such hydrogen synthesis may be provided from the syngas. In the process carbon monoxide may be used as a reductor to shift syngas entirely to $H_2$ (and $CO_2$). The high temperature water gas shift uses iron oxide as a catalyst and proceeds at a temperature in a range of from about 300° C. to about 500° C. A low-temperature process (e.g., around 200° C.) based on a copper-zinc oxide catalyst may drive the equilibrium further towards hydrogen, but may require clean feed gas. Thus, the hydrogen that can be produced by forming syngas may be increased through these reactions.

Additionally, any hydrogen gas or carbon monoxide gas may be purified. For example, the hydrogen gas or carbon monoxide gas may be purified using a pressure adsorption unit. This may produce hydrogen gas and/or carbon monoxide gas that may each have a purity of 90% to 99.9% or higher.

Methanol can be another product that may be formed from syngas produced according to the instant disclosure. Methanol can be a desirable product because it is a versatile intermediate for the chemical industry but may also serve as a fuel. Dimethyl ether (a derivative of methanol) may also be made from syngas and may be used as bottled gas for cooking (e.g., camping gas) or as a substitute for diesel fuel.

Methanol is also used in the transesterification of vegetable oils to produce biodiesel. Methanol may be produced catalytically.

Examples of reactions used to produce methanol from syngas include the following:

$$CO_2 + 3H_2 \rightleftharpoons CH_3OH + H_2O \quad -47 \text{ kJ/mol}$$

The above reaction may also be combined with the water-gas shift reaction described above, as shown below:

$$CO + 2H_2 \rightleftharpoons CH_3OH \quad -91 \text{ kJ/mol}$$

In examples where the syngas is used to produce ethanol, carbon dioxide may be present in the mixture of products. Specifically, the carbon dioxide may be present in an amount as high as 50 wt % (or as high as 30 wt %, 35 wt %, 40 wt % or 45 wt %) of the total amount of products. The carbon dioxide may be captured and used as a reactant for syngas production. The exact amount of carbon dioxide may depend on whether it is a non-converted by-product, or the final carbon content of a produced product.

Additionally, hydrocarbons used to form the basis of gasoline, diesel, jet fuel, and chemicals such as olefins and waxes may be synthesized using the syngas produced according to the instant disclosure. The hydrocarbons may be formed using Fischer-Tropsch Synthesis (FTS). FTS is used in gas-to-liquids (GTL) plants. The end product distribution resulting from an FTS process may include more than liquids and hydrocarbons alone, and may include methane and alkanes, as well as hydrocarbons having the formula $C_nH_{2n+2}$ (where n is in a range of from 1 to 100), alkenes or olefins (having the formula $C_nH_{2n}$ where n is greater than or equal to 2), and to a lesser extent oxygenated products such as alcohols. Catalysts for the Fischer-Tropsch Synthesis include those based on cobalt or iron. According to various aspects, the iron-based catalyst may be an iron carbide under reaction conditions, whereas a cobalt-based catalyst may be in the metallic state. Reaction conditions include temperatures in a range of from about 200° C. to 350° C. and pressures in a range of from about 20 and 50 bar.

Whichever product is formed from the syngas according to the instant disclosure, the product may include a high amount (by wt %) of carbon that is produced from the syngas. For example, a product formed using the syngas according to the instant disclosure may be in a range of from about 40 wt % to about 100 wt % carbon produced from the syngas of the instant disclosure, about 50 wt % to about 100 wt %, about 70 wt % to about 100 wt %, less than, equal to, or greater than about 40 wt %, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or about 100 wt %.

In some examples, a high proportion of the carbon produced by the instantly described methods of making syngas may be originated from a source of carbon dioxide emissions. For example, about 40 wt % to about 80 wt % of the carbon produced may be from a source of carbon dioxide emission (e.g., a co-product or by-product), or about 70 wt % to about 80 wt % of the carbon produced may be from a source of carbon dioxide emission, less than, equal to, or greater than about 40 wt %, 45, 50, 55, 60, 65, 70, 75, or about 80 wt %.

In some additional examples an even higher proportion of the carbon produced in manufacturing syngas may be obtained. For example, if the carbon dioxide used to make syngas is combined with a biogas for the source of methane, it is possible for about 90 wt % to about 100 wt % of carbon to be produced from greenhouse gas emissions and or renewable sources, 95 wt % to about 100 wt %, less than, equal to, or greater than about 90 wt %, 91, 92, 93, 94, 95, 96, 97, 98, 99, or about 100 wt %.

Additionally, because the syngas can be produced by a method that consumes greenhouse gases such as carbon dioxide and methane, a product formed from the syngas may have a low carbon score, may be carbon neutral, or may have a negative carbon score. The carbon score may be determined by quantifying the amount of greenhouse gas that is removed from the atmosphere in the process of making the product. For example, a carbon neutral product refers to a product that has a manufacturing process resulting in the net effect of not adding greenhouse gases to the atmosphere. As a further example, a carbon negative product refers to a product that has a manufacturing process that results in a net effect of removing greenhouse gases from the atmosphere.

In some further examples the syngas process described herein may be useful to economically produce blue hydrogen. Blue hydrogen is understood to refer to hydrogen formed when a natural gas is split into hydrogen and carbon dioxide and where the carbon dioxide is captured and not released to the atmosphere. Conventional blue hydrogen production may be environmentally and/or economically undesirable because of the carbon dioxide that is formed owing to the emission of the carbon dioxide to the atmosphere or the requirement of storing the carbon dioxide so that it is not emitted into the atmosphere. However, using the syngas production method described herein, carbon dioxide produced to form blue hydrogen may be fed into the syngas production method as a feedstock to react with methane to form syngas.

In some further examples, a plant or device associated with producing the instantly disclosed syngas may be co-located with a plant or device for making any product that uses or can use syngas as at least a partial feedstock. That is, syngas produced can be directly fed into a process for making a product.

EXAMPLES

Various aspects of the present invention may be better understood by reference to the following Examples which are offered by way of illustration. The present invention is not limited to the Examples given herein.

Example 1—Catalyst Preparation

Magnesium Oxide (MgO) powder was obtained and the loss on ignition (LOI) and water pickup of the MgO powder was determined. LOI was less than 5% and water pickup ranged from 10% to 75%. An amount of nickel nitrate hexa-hydrate ("NNHH") needed to reach about 15 wt % nickel based on the total dry weight of the MgO powder was added. The NNHH was then impregnated, according to an incipient wetness (IW) technique, into the MgO powder to form an impregnated powder. The impregnated powder was dried at a temperature in a range of from 90° C. to 100° C. in a rotary evaporator (rotavap) until a dry free flowing material was obtained. The obtained powder was calcined in air at 600° C. for 2 hrs. An acceptable aid (e.g., an organic lubricant such as Abril 1071 (a lubricant available from Abril Industrial Waxes limited) was added to the obtained powder to produce a suitable amount (each being about 2.5±0.5 mm diameter, and length such that an aspect ratio about is 1:1). These were then calcined at 1000° C. for 2 hrs. to obtain the catalyst.

Example 2—Catalyst Structure

Figure 1:
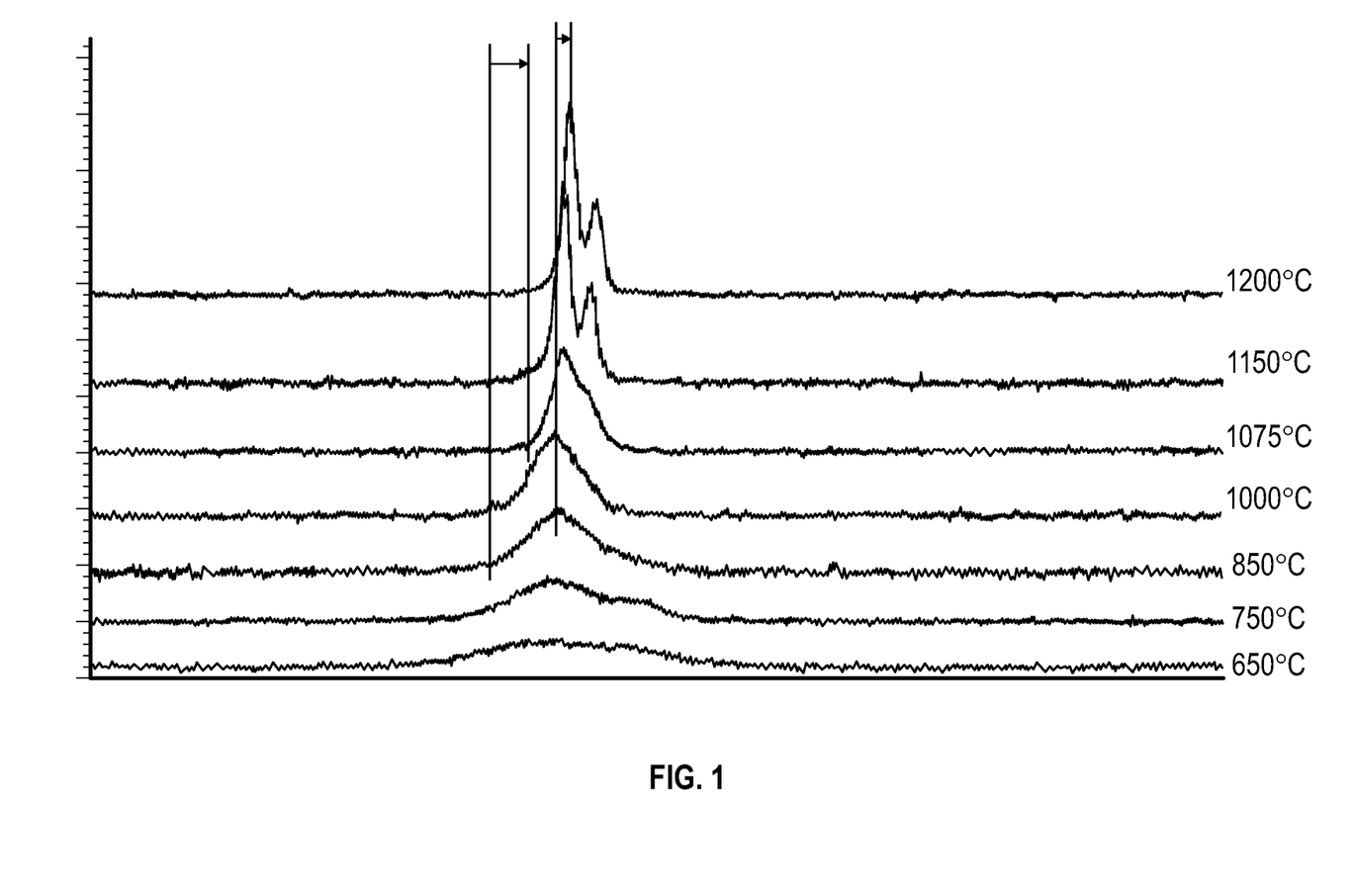
FIG. 1 is an X-Ray Diffraction plot, in accordance with various aspects.

The state of the catalyst formed according to Example 1 was confirmed using X-Ray Diffraction (XRD), results are shown in FIG. 1. Formation of the Ni/Mg catalytic alloy was detected at about 94 degrees (2-theta) (2θ) in the X-Ray diffractogram (spectra) of the catalyst. Crystallinity (ordered patterns of individual atoms and/or molecules) of the catalyst increased with increased calcination temperature (from 600° C. to 1,200° C.) which led to progressive sharpening of the XRD peak. The catalyst was attained through a mixture of predominantly crystalline phase, but a minor amount of amorphous phase was also needed to retain external surface area for catalytic activity. A 100% crystalline material, as exemplified by the XRD spectra was obtained at 1,150° C. and 1,200° C. calcination, has zero catalytic surface area and exhibits very little catalytic activity. The formation of the "satellite peak" at the aforementioned two temperatures was a result of the highly crystalline reflective planes within the solid solution.

The data set showed that the optimal mixture or alloy was produced by calcination between 1,000° C. and 1,075° C. representing a mixture of crystalline and amorphous states.

Figure 2:
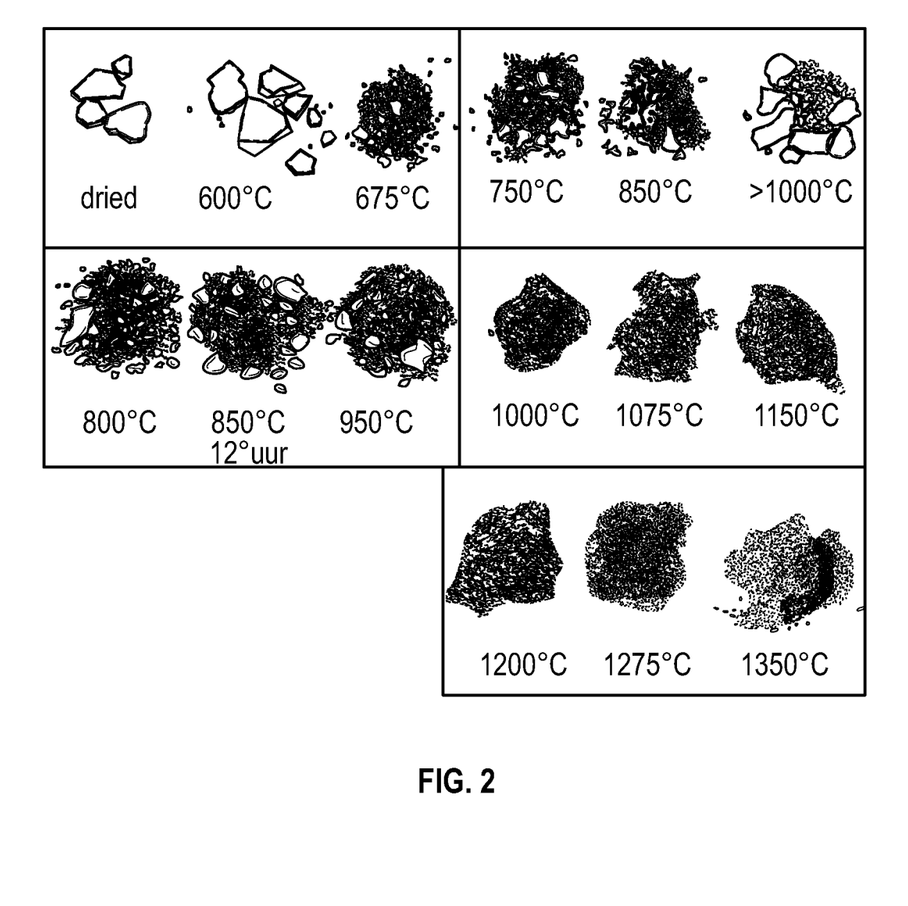
FIG. 2 provides a series of photographs showing catalysts calcined at different temperatures, in accordance with various aspects.

In addition to the XRD data, the series of images provided as FIG. 2 shows the progression of color of the samples towards the desired "olive green" color needed for optimal mixture or alloy. The more intense the green, the more crystalline the material is. As shown in FIG. 2, calcination at 1,150° C. and above rendered the most intense green, indicating 100% crystallinity of the mixture or alloy at virtually zero catalytic surface area.

Example 3—Catalyst Surface Area

Catalyst surface area, determined according to the Braunauer-Emmett-Teller (BET) theory, was determined as a function of the calcination temperature described herein above in Example 1. Results are shown in Table 1:

TABLE 1

| Calcination Temperature (° C.) | BET Surface Area (m²/g) |
|---|---|
| 850 | 26 |
| 1000 | 9 |
| 1150 | Less than 1 |

Example 4—Size of MgOs

The size of the MgOs used in Example 1 was controlled in some aspects. The size was controlled by milling a quantity of MgOs for about 6 hours in a Netzsch ball mill. This procedure resulted in the size distribution shown below in Table 2.

TABLE 2

| | |
|---|---|
| $d_{10}$ | 0.238 microns (μm) |
| $d_{50}$ | 0.430 microns (μm) |
| $d_{90}$ | 0.791 microns (μm) |
| $d_{99}$ | 1.400 microns (μm) |

Example 5—Syngas Production

A catalyst formed according to the protocol of Example 1 was used to prepare syngas.

The reactor is a 3.0-meter-long tube. The tube is evenly divided along a longitudinal axis into six zones. Zones 2-6 are packed with the catalyst. The inlet (which is adjacent to zone 1), Zone 1 (which is between the inlet and Zone 2) and outlet (which is adjacent to Zone 6) are packed with Accu Grains 8™ (a high alumina support media (substrate) available from Saint-Gobain NorPro, Stow OH). A total of 6,950 ml of catalyst was deployed in Zones 2-6. Data showing the formation of syngas and their respective wt % of products are shown below in Table 3 where a molar ratio of steam to carbon ranges from 0.8 to 0.9.

TABLE 3

| SCFH $CO_2$ | SCFH $CH_4$ | $H_2O$ mL/Min | Zone 1 (° C.) | Zone 2 (° C.) | Zone 3 (° C.) | Zone 4 (° C.) | Zone 5 (° C.) | Zone 6 (° C.) | Vol % CO (product) | Vol % $CO_2$ (product) | Vol % $CH_4$ (product) | Vol % $H_2$ (product) |
|---|---|---|---|---|---|---|---|---|---|---|---|---|
| 89 | 196 | 63 | 854 | 1417 | 1487 | 1513 | 1620 | 1749 | 31.49 | 1.68 | 1.83 | 64.42 |
| 72 | 157 | 50 | 1265 | 1569 | 1567 | 1591 | 1675 | 1745 | 31.25 | 1.95 | 1.87 | 64.29 |
| 57 | 105 | 30 | 1297 | 1515 | 1529 | 1570 | 1668 | 1729 | 33.25 | 1.74 | 1.29 | 62.98 |

The terms and expressions that have been employed are used as terms of description and not of limitation, and there is no intention in the use of such terms and expressions of excluding any equivalents of the features shown and described or portions thereof, but it is recognized that various modifications are possible within the scope of the aspects of the present invention. Thus, it should be understood that although the present invention has been specifically disclosed by specific aspects and optional features, modification and variation of the concepts herein disclosed may be resorted to by those of ordinary skill in the art, and that such modifications and variations are considered to be within the scope of aspects of the present invention.

Exemplary Aspects

The following exemplary aspects are provided, the numbering of which is not to be construed as designating levels of importance:

Aspect 1 provides a catalyst for catalyzing the production of syngas from a mixture comprising steam, hydrocarbon, and carbon dioxide, the catalyst comprising:

a metal oxide substrate comprising a nickel species, wherein an exposed surface of the catalyst comprises at least some of the nickel species and the exposed surface is substantially nonporous.

Aspect 2 provides the catalyst of Aspect 1, wherein a pore volume of the individual catalysts is less than 0.1 cm$^3$/g.

Aspect 3 provides the catalyst of any of Aspects 1 or 2, wherein the hydrocarbon is a C1-C4 hydrocarbon.

Aspect 4 provides the catalyst of any of Aspects 1-3, wherein the hydrocarbon comprises methane.

Aspect 5 provides the catalyst of any of Aspects 1-4, wherein the catalyst is sintered by high temperature calcination.

Aspect 6 provides the catalyst of any of Aspects 1-5, wherein a molar ratio of a total steam to total carbon content ratio of the mixture is in a range of from about 0.5:1 to 2:1, wherein the total carbon content combines the amount of hydrocarbon and carbon dioxide in the mixture.

Aspect 7 provides the catalyst of any of Aspects 1-6, wherein a molar ratio of a total steam to total carbon content ratio of the mixture is in a range of from about 0.5:1 to 1.5:1, wherein the total carbon content combines the amount of hydrocarbon and carbon dioxide in the mixture.

Aspect 8 provides the catalyst of any of Aspects 1-7, wherein a molar ratio of a total steam to total carbon content ratio of the mixture is in a range of from about 0.5:1 to 1.2:1, wherein the total carbon content combines the amount of hydrocarbon and carbon dioxide in the mixture.

Aspect 9 provides the catalyst of any of Aspects 1-8, wherein the metal oxide substrate comprises NiO, CoO, FeO, MnO, MgO, or a mixture thereof.

Aspect 10 provides the catalyst of any of Aspects 1-9, wherein the metal oxide substrate comprises MgO.

Aspect 11 provides the catalyst of any of Aspects 1-10, wherein the metal oxide substrate is substantially spherical, substantially cylindrical, substantially flat, or comprises an undulating profile.

Aspect 12 provides the catalyst of any of Aspects 1-11, wherein the metal oxide substrate is a monolithic structure.

Aspect 13 provides the catalyst of any of Aspects 1-12, wherein the nickel species is 0.2 wt % to 30 wt % of the catalyst.

Aspect 14 provides the catalyst of any of Aspects 1-13, wherein the nickel species is 12 wt % to 15 wt % of the catalyst.

Aspect 15 provides the catalyst of any of Aspect 1-14, wherein the nickel species is homogeneously distributed about the metal oxide substrate.

Aspect 16 provides the catalyst of any of Aspects 1-15, wherein the nickel species comprises less than 1 wt % elemental nickel.

Aspect 17 provides the catalyst of any of Aspects 1-16, wherein the nickel species is free of elemental nickel.

Aspect 18 provides the catalyst of any of Aspects 1-17, wherein the nickel species is homogeneously distributed about the metal oxide substrate.

Aspect 19 provides the catalyst of Aspect 18, wherein a minor portion of the nickel species is located proximate to a surface of the metal oxide substrate.

Aspect 20 provides the catalyst of Aspect 18, wherein about 80 to about 100 wt % of the nickel species is located at a surface of the metal oxide substrate.

Aspect 21 provides the catalyst of any of Aspects 1-20, wherein at least a portion of the nickel species is exposed on a surface of the metal oxide substrate.

Aspect 22 provides the catalyst of Aspect 21, wherein the portion of the nickel species exposed on a surface of the metal oxide substrate is in a range of from about 10 wt % to about 30 wt % of the nickel species.

Aspect 23 provides the catalyst of any of Aspects 21 or 22, wherein the portion of the nickel species exposed on a surface of the metal oxide substrate is in a range of from about 14 wt % to about 18 wt % of the nickel species.

Aspect 24 provides the catalyst of any of Aspects 1-23, wherein the largest dimension of the catalyst is in a range of 20 μm to 52 mm.

Aspect 25 provides the catalyst of any of Aspects 1-24, wherein the largest dimension of the catalyst is in a range of 4 mm to 6 mm.

Aspect 26 provides the catalyst of any of Aspects 1-25, wherein the catalyst further comprises potassium ions.

Aspect 27 provides the catalyst of Aspect 26, wherein a majority of the potassium ions are in/at a surface of the metal oxide substrate.

Aspect 28 provides the catalyst of any of Aspects 26 or 27, wherein the potassium ions range from about 0.2 wt % to about 5 wt % of the catalyst.

Aspect 29 provides the catalyst of any of Aspects 26-28, wherein the potassium ions range from about 1 wt % to about 2 wt % of the catalyst.

Aspect 30 provides the catalyst of any of Aspects 1-29, wherein the catalyst comprises less than about 2 wt % free elemental nickel, free nickel oxide, or a mixture thereof in the nickel species.

Aspect 31 provides the catalyst of any of Aspects 1-30, wherein the catalyst comprises less than about 0.5 wt % free elemental nickel, free nickel oxide, or a mixture thereof in the nickel species.

Aspect 32 provides the catalyst of any of Aspects 1-31, wherein the catalyst is free of free elemental nickel, free nickel oxide, or a mixture thereof in the nickel species.

Aspect 33 provides the catalyst of any of Aspects 1-32, wherein the catalyst is a catalytic alloy.

Aspect 34 provides a method of making the catalyst of any of Aspects 1-33, the method of making the catalyst comprising:
mixing a nickel solution into a metal oxide powder with incipient wetness impregnation, to form a paste;
or mixing powders in an oxide form to make a slurry;
drying the paste or slurry to produce a dispersed powder; and
calcining the dried powder.

Aspect 35 provides the method of Aspect 34, wherein the nickel solution comprises nickel (II) nitrate hexahydrate, nickel (II) di-acetate, nickel (II) carbonate, or a combination thereof.

Aspect 36 provides the method of Aspect 34 or 35, wherein the nickel solution comprises nickel (II) nitrate hexahydrate.

Aspect 37 provides the method of any of Aspects 34-36, wherein the calcining of the dried powder is performed at a temperature in a range of from about 400° C. to about 2000° C. for a time in a range of from about 0.5 hours to about 12 hours.

Aspect 38 provides the method of any of Aspects 34-37, wherein calcining the dried powder occurs at a temperature in a range of from about 500° C. to about 1500° C. for a time in a range of from about 1 hour to about 3 hours.

Aspect 39 provides the method of any of Aspects 34-38, wherein calcining the dried powder occurs at a temperature in a range of from about 950° C. to about 1050° C. for a time in a range of from about 1 hour to about 3 hours.

Aspect 40 provides the method of any of Aspects 34-39, wherein the calcining of the dried powder is performed at a temperature in a range of from about 800° C. to about 1500° C. for a time in a range of from about 0.5 hours to about 4 hours.

Aspect 41 provides the method of any of Aspects 34-40, wherein calcining the dried powder is performed at a temperature in a range of from about 900° C. to about 1100° C. for a time in a range of from about 1 hour to about 3 hours.

Aspect 42 provides the method of any of Aspects 34-41, further comprising treating these with potassium nitrate, potassium acetate, potassium carbonate, or a mixture thereof.

Aspect 43 provides the method of any of Aspects 34-42, wherein a $d_{50}$ of the metal oxide powder is in a range of from about 2 μm to about 120 μm.

Aspect 44 provides the method of any of Aspects 34-43, wherein a $d_{50}$ of the metal oxide powder is in a range of from about 5 μm to about 100 μm.

Aspect 45 provides a method of using the catalyst of any of Aspects 1-44, the method comprising:
contacting the catalyst with the mixture of steam, hydrocarbon, and carbon dioxide to produce the syngas comprising carbon monoxide and hydrogen and less than about 5 wt % methane.

Aspect 46 provides the method of using the catalyst of Aspect 45, wherein the hydrogen and carbon monoxide are produced in a molar ratio in a range of from about 4:1 to about 1:4.

Aspect 47 provides the method of using the catalyst of any of Aspects 45 or 46, wherein a molar ratio of the hydrogen and carbon monoxide is variable.

Aspect 48 provides the method of any of Aspects 45-47, wherein an amount of energy used to generate steam is at least 50% less than a corresponding amount of energy used to create steam using a conventional catalyst that differs from the catalyst of any of Aspects 1-47.

Aspect 49 provides the method of any of Aspects 45-48, wherein an amount of carbon dioxide emitted is in a range of from about 90% to about 95% less than a corresponding amount of carbon dioxide emission from a method using a using a conventional catalyst that differs from the catalyst of any of Aspects 1-47.

Aspect 50 provides the method of using the catalyst of any of Aspects 45-49, further comprising activating the catalyst.

Aspect 51 provides the method of using the catalyst of Aspect 50, wherein activating the catalyst comprises contacting the catalyst with a mixture of hydrogen gas and nitrogen gas for a time in a range of from about 1 hour to about 6 hours at a temperature in a range of from about 400° C. to about 600° C., wherein a ratio of hydrogen gas to nitrogen gas is in a range of from about 90:10 to about 70:30.

Aspect 52 provides the method of using the catalyst of any of Aspects 45-51, wherein at least 70 wt % of the mixture that contacts the catalyst is converted to carbon monoxide and hydrogen per turn.

Aspect 53 provides the method of using the catalyst of any of Aspects 45-52, wherein at least 90 wt % of the mixture of steam, hydrocarbon, and carbon dioxide that interact with the catalyst are converted to carbon monoxide and hydrogen per turn.

Aspect 54 provides the method of using the catalyst of any of Aspects 45-53, wherein about 70 wt % to about 99 wt % of the mixture of steam, hydrocarbon, and carbon dioxide that interact with the catalyst are converted to carbon monoxide and hydrogen per turn.

Aspect 55 provides the method of using the catalyst of any of Aspects 45-54, wherein about 90 wt % to about 99 wt % of the mixture of steam, hydrocarbon, and carbon dioxide that interact with the catalyst are converted to carbon monoxide and hydrogen per turn.

Aspect 56 provides the method of using the catalyst of any of Aspects 45-55, wherein about 95 wt % to about 98 wt % of the mixture of steam, hydrocarbon, and carbon dioxide that interact with the catalyst are converted to carbon monoxide and hydrogen per turn.

Aspect 57 provides the method of using the catalyst of any of Aspects 45-56, wherein the catalyst performs at a gas hourly space velocity of about 1000 to about 20000.

Aspect 58 provides the method of using the catalyst of any of Aspects 45-57, wherein the catalyst performs at a gas hourly space velocity of about 3000 to about 5000.

Aspect 59 provides the method of using the catalyst of any of Aspects 45-58, wherein the reaction is performed at a temperature greater than about 815° C.

Aspect 60 provides the method of using the catalyst of any of Aspects 45-59, wherein the reaction is performed at a temperature greater than about 954° C.

Aspect 61 provides the method of using the catalyst of any of Aspects 45-60, wherein the reaction is performed at a temperature in a range of from about 276° C. to about 1371° C.

Aspect 62 provides the method of using the catalyst of any of Aspects 45-61, wherein the reaction is performed at a temperature in a range of from about 815° C. to about 1093° C.

Aspect 63 provides the method of using the catalyst of any of Aspects 45-62, wherein the catalyst is substantially free of coking during performance of the method.

Aspect 64 provides the method of using the catalyst of any of Aspects 45-63, wherein the catalyst is substantially free of coking during performance of the method with continuous operation for at least 1 year.

Aspect 65 provides the method of using the catalyst of any of Aspects 45-64, wherein the catalyst is substantially free of coking during continuous operation for at least 2 years.

Aspect 66 provides the method of using the catalyst of any of Aspects 45-65, wherein the catalyst is substantially free of coking during continuous operation for at least 3 years.

Aspect 67 provides the method of using the catalyst of any of Aspects 45-66, wherein one or more components of the mixture of steam, hydrocarbon, and carbon dioxide are provided from an industrial emission, an air captured carbon source, or both.

Aspect 68 provides the method of using the catalyst of any of Aspects 45-67, wherein heat is provided from an industrial process source.

Aspect 69 provides the method of using the catalyst of any of Aspects 45-68, wherein the mixture of steam, hydrocarbon, and carbon dioxide are contacted with the catalyst at a pressure in a range of from about 25 KPa to about 3500 KPa.

Aspect 70 provides the method of using the catalyst of any of Aspects 45-69, wherein the mixture of steam, hydrocarbon, and carbon dioxide are contacted with the catalyst at a pressure in a range of from about 30 KPa to about 2100 KPa.

Aspect 71 provides the method of using the catalyst of any of Aspects 45-70, wherein a feed stream comprising the mixture of steam, hydrocarbon, and carbon dioxide has a flow rate, measured as gas hourly space velocity (GHSV), of from about 500 $h^{-1}$ to about 15000 $h^{-1}$.

Aspect 72 provides the method of using the catalyst of any of Aspects 45-71, wherein a feed stream comprising the mixture of steam, hydrocarbon, and carbon dioxide has a flow rate, measured as gas hourly space velocity (GHSV), of from about 1000 $h^{-1}$ to about 10000 $h^{-1}$.

Aspect 73 provides the method of any of Aspects 45-72, further comprising treating the catalyst with steam before or after producing the syngas.

Aspect 74 provides the method of Aspect 73, wherein the catalyst is treated with steam at a temperature in a range of from about 150° C. to about 1000° C. for 0.2 hours to 20 hours.

Aspect 75 provides the method of any of Aspects 73 or 74, wherein the catalyst is treated with steam at a temperature in a range of from about 200° C. to about 260° C. from 2 hours to 15 hours.

Aspect 76 provides the method of any of Aspects 73-75, further comprising supplementing the produced carbon monoxide and hydrogen with an external source of hydrogen.

Aspect 77 provides the method of Aspect 76, wherein the external source of hydrogen is a renewable source of hydrogen.

Aspect 78 provides the method of Aspect 77, wherein the renewable source of hydrogen is produced by electrolysis.

Aspect 79 provides the method of any of Aspects 45-78, wherein the C1-C4 hydrocarbon is sourced from a renewable natural gas, a landfill emission, an oil well emission, a coal mine emission, or a mixture thereof.

Aspect 80 provides the method of any of Aspects 45-79, wherein the syngas produced is not subjected to any additional processing to refine the molar ratio of the syngas constituents.

Aspect 81 provides the method of any of Aspects 45-80, further comprising utilizing excess heat, excess carbon dioxide, or both in another process.

Aspect 82 provides a method of using syngas produced according to any of Aspects 45-81, the method comprising:
forming a product from a feedstock comprising the syngas.

Aspect 83 provides the method of using syngas of Aspect 82, wherein the product comprises a paraffinic base oil, a paraffinic wax, a solvent, a fuel, ammonia, methanol, ethanol, propanol, butanol, pentanol, acetic acid, dimethoxyethane, purified $H_2$, purified CO, a blend of hydrogen and carbon monoxide, amide, dimethylcarbonate, ethylmethylcarbonate, oxo-alcohols, graphene, carbon fiber, carbon nanotubes, carbon black, graphite, or a mixture thereof.

Aspect 84 provides the method of using syngas of any of Aspects 82 or 83, wherein the syngas is directly fed into the method for forming the product.

Aspect 85 provides a product comprising about 20 wt % to about 100 wt % carbon produced from the method of any of Aspects 82-84.

Aspect 86 provides the product of Aspect 85, comprising about 50 wt % to about 100 wt % carbon produced from the method of any of Aspects 82-85.

Aspect 87 provides the product of any of Aspects 85 or 86, comprising about 70 wt % to about 100 wt % carbon produced from the method of any of Aspects 82-86.

Aspect 88 provides the product of any of Aspects 85-87, wherein about 40 wt % to about 80 wt % of the carbon produced from the method of any of Aspects 77-79 is from a source of carbon dioxide emission, hydrocarbon emission, or both.

Aspect 89 provides the product of any of Aspects 85-88, wherein about 70 wt % to about 80 wt % of the carbon produced from the method of any of Aspects 82-84 is from a source of carbon dioxide emission, hydrocarbon emission, or both.

Aspect 90 provides an assembly comprising: a reaction vessel comprising the catalyst of any of Aspects 1-89 located within the reaction vessel.

Aspect 91 provides the assembly of Aspect 90, wherein the reaction vessel comprises a metal tube.

Aspect 92 provides the assembly of Aspect 91, wherein the metal tube comprises a nickel alloy.

Aspect 93 provides the assembly of any of Aspects 91 or 92, wherein the tube comprises a plurality of the catalysts evenly distributed about an interior of the tube.

Aspect 94 provides the assembly of any of Aspects 91-93, further comprising a heat source in thermal communication with the reaction vessel.

Aspect 95 provides the assembly of Aspect 94, further comprising a feedback loop to direct carbon dioxide produced by the heat source to the reaction vessel to participate in the method of any of Aspects 80-84.

Aspect 96 provides the assembly of any of Aspects 91-95, further comprising a feed source of carbon dioxide that is captured from an industrial emission, a direct air capture source, or both.

Aspect 97 provides the assembly of any of Aspects 85-96, wherein the assembly is an existing assembly having the catalyst retrofit into the existing assembly.

What is claimed is:

1. A method of using a catalyst the method comprising:
contacting the catalyst with a mixture of steam, hydrocarbon, and carbon dioxide, wherein the molar ratio of a total steam to total carbon content ratio of the mixture is up to about 2:1, to produce a syngas comprising carbon monoxide and hydrogen and containing less than about 5 wt % hydrocarbon, wherein the catalyst comprises a metal oxide substrate comprising a nickel species in contact therewith, wherein an exposed surface of the catalyst comprises at least some of the nickel species and the exposed surface is substantially non-porous, the metal oxide comprising NiO, CoO, FeO, MnO, MgO, or a mixture thereof,
wherein the catalyst has a catalytic surface area ranging from about 0.05 $m^2/g$ to 9 $m^2/g$; and
wherein the method is performed at a temperature in a range of from about 537° C. to about 1371° C.

2. The method of using the catalyst of claim 1, wherein a molar ratio of the hydrogen and carbon monoxide is variable.

3. The method of claim 1, wherein one or more components of the mixture of steam, hydrocarbon, and feed source of carbon dioxide is captured from an industrial emission, biological process, recycle streams from the process or a direct air capture source, or a combination thereof.

4. The method of claim 1, wherein the catalyst is placed in an existing reformer assembly to retrofit the existing assembly.

5. The method of claim 1, wherein an amount of carbon dioxide emitted is in a range of from about 25% to about 97% less than a corresponding method having a different catalyst.

6. The method of using the catalyst of claim 1, wherein at least 50 wt % of the mixture that contacts the catalyst is converted to carbon monoxide and hydrogen per turn.

7. The method of using the catalyst of claim 1, wherein about 70 wt % to about 99 wt % of the mixture of steam, hydrocarbon, and carbon dioxide that contact the catalyst are converted to carbon monoxide and hydrogen per turn.

8. The method of using the catalyst of claim 1, wherein the method performs at a gas hourly space velocity of about 1000 to about 20000 $h^{-1}$.

9. The method of using the catalyst of claim 1, wherein the method is performed at a temperature in a range of from about 760° C. to about 1200° C.

10. The method of using the catalyst of claim 1, wherein the catalyst is substantially free of coking during performance of the method.

11. The method of using the catalyst of claim 1, wherein the mixture of steam, hydrocarbon, and carbon dioxide are contacted with the catalyst at a pressure in a range of from about 25 KPa to about 3500 KPa.

12. The method of claim 1, wherein the hydrocarbon comprises a C1-C4 hydrocarbon sourced from a renewable natural gas, a landfill emission, an oil well emission, a coal mine emission, or a mixture thereof.

13. The method of claim 1, wherein the syngas produced is not subjected to any additional processing to alter a molar ratio of syngas constituents.

14. A method of using syngas produced according to the method of claim 1, the method comprising:
   forming a product from a feedstock comprising the syngas.

15. The method of using syngas of claim 14, wherein the product comprises a paraffinic base oil, a paraffinic wax, a solvent, a fuel, ammonia, methanol, ethanol, propanol, butanol, pentanol, acetic acid, dimethoxyethane, purified H2, purified CO, a blend of hydrogen and carbon monoxide, amide, dimethylcarbonate, ethylmethylcarbonate, oxo-alcohols, graphene, carbon fiber, carbon nanotubes, carbon black, graphite, or a mixture thereof.

16. The product of claim 14, wherein about 20 wt % to about 50 wt % of the carbon produced is from a non-hydrocarbon source.

17. The method of claim 1, wherein the nickel species comprises nickel oxide.

* * * * *